United States Patent [19]

Mizoguchi et al.

[11] Patent Number: 4,946,255
[45] Date of Patent: Aug. 7, 1990

[54] IMAGE INPUT APPARATUS WITH LENS ADJUSTMENT

[75] Inventors: Yoshiyuki Mizoguchi, Yokohama; Yoshitaka Watanabe, Tokyo, all of Japan

[73] Assignee: Canon Kabushiki Kaisha, Tokyo, Japan

[21] Appl. No.: 257,560

[22] Filed: Oct. 14, 1988

[30] Foreign Application Priority Data

Oct. 15, 1987 [JP] Japan ................................ 62-260852

[51] Int. Cl.$^5$ ............................................. G02B 7/04
[52] U.S. Cl. ..................................... 350/255; 350/257
[58] Field of Search ............... 350/252, 255, 257, 247, 350/429, 558

[56] References Cited

U.S. PATENT DOCUMENTS

| | | | |
|---|---|---|---|
| 4,351,587 | 9/1982 | Matsuo et al. | 350/255 |
| 4,498,737 | 2/1985 | Doggett | 350/255 |
| 4,572,612 | 2/1986 | Schlapp et al. | 350/257 |
| 4,722,000 | 1/1988 | Chatenever | 350/558 |
| 4,740,058 | 4/1988 | Hori et al. | 350/257 |
| 4,781,448 | 11/1988 | Chatenever et al. | 350/429 |

Primary Examiner—Bruce Y. Arnold
Assistant Examiner—Martin Lerner
Attorney, Agent, or Firm—Fitzpatrick, Cella, Harper & Scinto

[57] ABSTRACT

An image input apparatus in which a lens is exchangeable has a mount for mounting a lens and a member for adjusting a mounting position of the lens. The mount and the member are each constituted as a separate member, and are arranged such that the apparatus is, at the same time, capable of performing adjustment of the angle between an optical axis of the lens and a surface of a CCD.

11 Claims, 3 Drawing Sheets

IMAGE INPUT APPARATUS WITH LENS ADJUSTMENT

BACKGROUND OF THE INVENTION

1. Field of the Invention

This invention relates to lens adjustment for an image input apparatus.

2. Description of the Prior Art

Heretofore, the mounting of a lens to an image input apparatus has been performed by a method such as that shown in FIG. 1. In FIG. 1, there is shown a mount 1 for mounting a lens 2, for which a C-mount is generally used in an image input apparatus because of its general applicability as illustrated in the present example. Within a body 3 of an image input apparatus are incorporated a COD as an imaging device and other circuits.

There are also shown an adjusting member 4 used when the mount 1 is mounted to the body 3, and a screw 5 for mounting the mount 1 to the body 3. An imaging device CCD 6, being a considerable heat source, is fixed to a radiating mass 7 made of a substance having a good heat conductivity, such as aluminum, and the radiating mass 7 is securely fixed to the body 3 in a surface contact relationship.

There are three adjusting members 4 and three screws 5 respectively on the circumference of a circle, centering around the optical axis, and the mechanism of mount adjustment is as illstrated in FIG. 1.

A portion 4b of each adjusting member 4 is a screw, and a confronting portion 4a is moved up and down by rotating the adjusting member 4.

Since the mount 1 is fastened downward by the screws 5, the mount 1 hits the confronting protion 4a of the adjusting members 4, and in this fashion the position is determined. Accordingly, by adjusting by means of rotating three adjusting members 4, it is possible to adjust the distance, and further the inclination, of the mount 1 with regard to the CCD surface.

In the conventional example described above, however, only the confronting portions 4a of the three adjusting members 4 receive the mount 1, and moreover the adjusting members 4 are only pressed down by the mount 1, not securely fixed. Hence, when there is applied vibration and the like to the body, the adjusting members 4 rotate, the confronting portions 4a move downward, the fastening by the screws 5 become looser, and finally there is a possibility of disconnection of the screws and further of the mount. It is possible to prevent the disconnection of the mount due to vibration and the like if the adjusting members 4 are screw-locked by adhesive, but readjustment becomes impossible once adjustment has been done and the adjusting members have been screw-locked.

It is known, however, that in the C mount lens to be mounted to an image input apparatus, there exist greater or smaller differences in the back-focus position (the position from the confronting portion 2a of the lens to the focusing surface) among lenses. Hence, it is necessary to perform a fine adjustment of the mount for each lens mounted on an image input apparatus. Accordingly, it is impossible to perform screw-locking of adjusting members, and thus the disadvantage of sensitivity to vibration has not been solved.

SUMMARY OF THE INVENTION

It is an object of the present invention to solve the aforementioned disadvantages in the conventional examples, and to provide a mount the fine adjustment of which is easy, and at the same time such that the mount is capable of stably holding a lens in the adjusted condition even after the adjustment.

It is another object of the present invention to provide an image input apparatus having a mount the adjustment of which on the occasion of lens exchange is easy and which at the same time as stable.

In the present invention, in order to achieve the above-described objects, a configuration is adopted wherein the mount is divided into two members: one member mounts a lens, adjusts the inclination between the CCD and the lens and securely fixes the lens to the body; the other member can adjust the position of back-focus, whereby back-focus adjustment of the lens becomes possible, and at the same time a mount having a structure resistant to outside disturbance such as vibration can be realized.

The other objects and features of the present invention will become apparent from the following detailed description of the preferred embodiment, taken in connection with the accompanying drawings.

DETAILED DESCRIPTION OF THE PREFERRED EMBODIMENT

Figure 1:
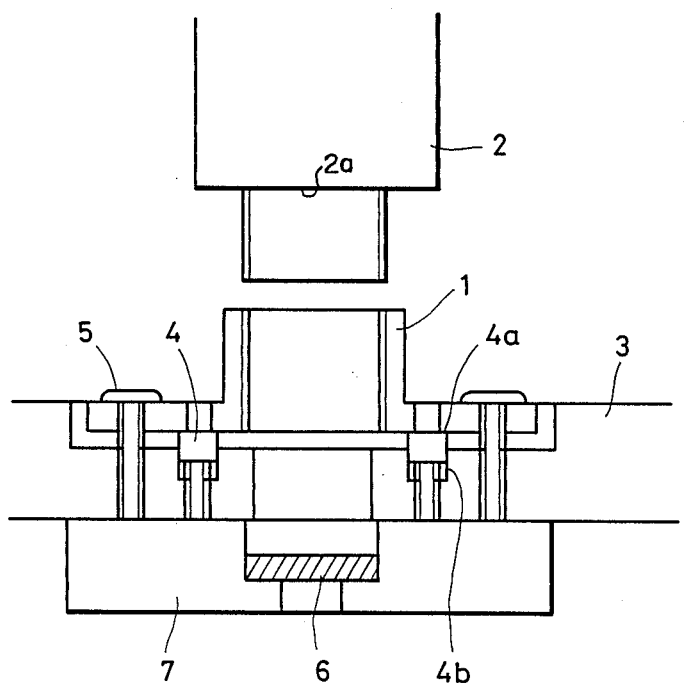
FIG. 1 is a cross-sectional view of a conventional example.
Figure 2:
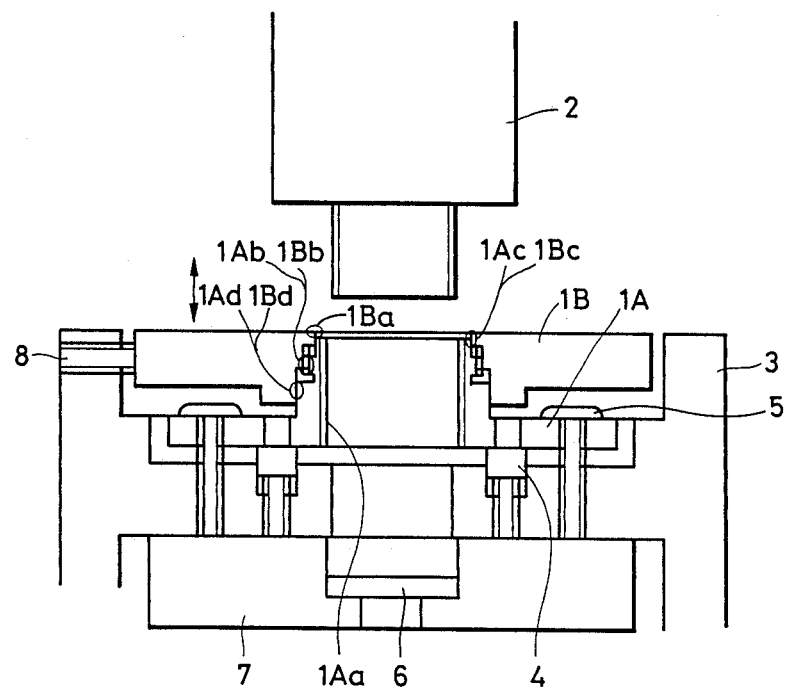
FIG. 2 is a cross-sectional view of the preferred embodiment of the present invention.
Figure 3:
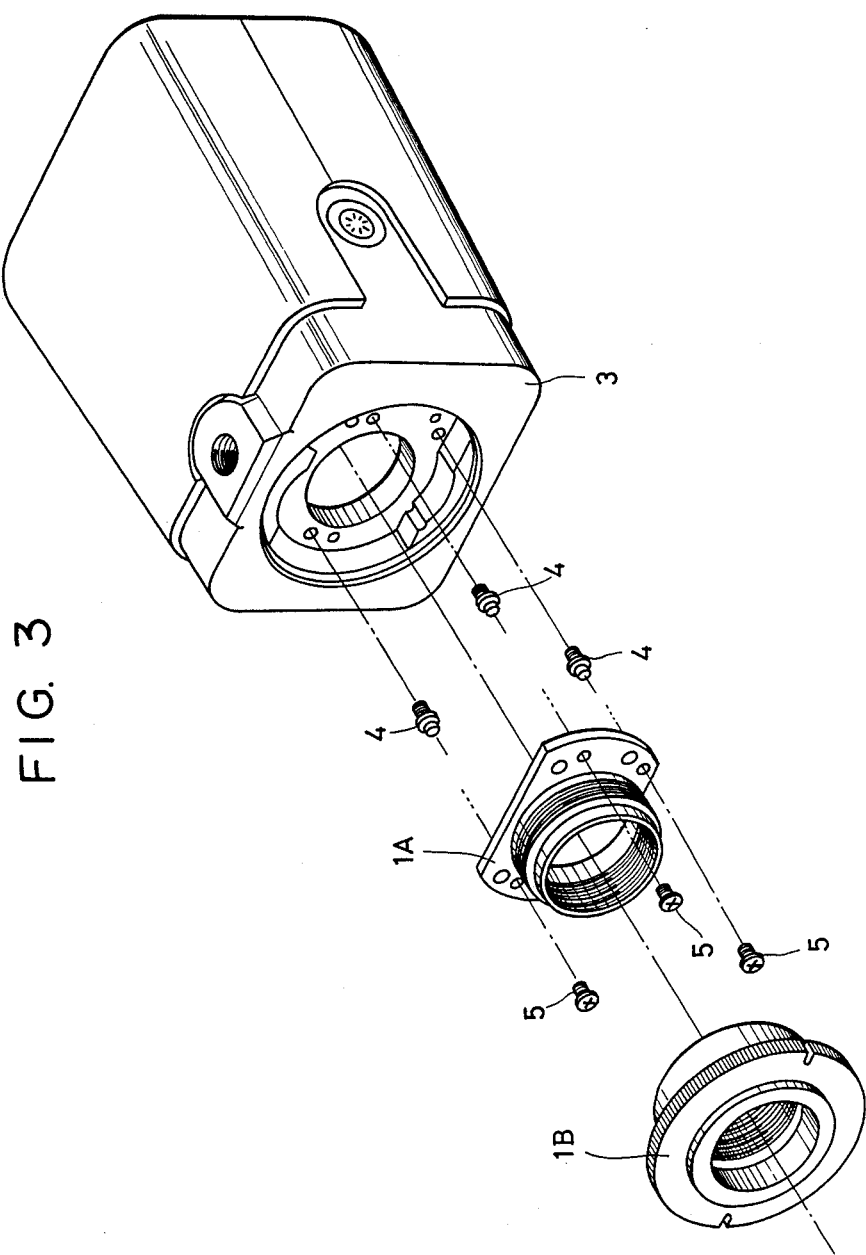
FIG. 3 is a perspective view of the embodiment of FIG. 2.

FIGS. 2 and 3 illustrate the preferred embodiment of the present invention. A mount A, which is shown as 1A is, fixed to a body 3 by three screws 5, and there are three adjusting screws 4 between the mount A and the body. In the portion of the mount A denoted by 1Aa there is a C-mount screw, and it is possible to mount a lens therein.

Now, the portions denoted 1Bc and 1Bd of a mount 1B fit the portions 1Ac and 1Ad of the mount 1A, and screw portion 1Bb of the mount 1B threadedly engages screw portion 1Ab of the mount 1A. Accordingly, by rotating the mount 1B, the mount 1B is moved up and down in the direction of the arrow, and thereby the position of a confronting portion 1Ba can be adjusted. There is also shown in FIG. 2 a setscrew 8 for mount 1B.

Other constituents are the same as in the conventional example.

Accordingly, the CCD 6 as an imaging device is fixed to the radiating mass 7 by means such as threading (not illustrated), and the radiating mass 7 is fixed to the body 3 with screws (not illustrated). Hence, the heat generated from the CCD 6 is transmitted to the body 3 through the radiating mass 7, and is radiated outside.

The fixation of the mount 1A to the body is performed in the same way as explained in connection with the conventional example: i.e., the amount 1A is received by the three adjusting members 4, and by adjusting these adjusting members 4 the optical axis of the lens is made to be perpendicular to the CCD surface. These adjusting members 4 are screw-locked by adhesives and the like after adjustment, so that they do not loosen even as a result of outside disturbance such as vibration, and the mount 1A is securely fixed. The adjustment of back-focus which is different for each lens is performed by means of the mount 1B. That is, when the mount 1B is rotated, the lens-confronting surface 1Ba of the mount 1B moves up and down as shown by the arrow in FIG. 2. The lens is mounted to the screw portion 1Aa of the mount 1A, and is screwed in until it hits the lens-confronting surface 1Ba of the mount 1B, and the fixing position is determined. Accordingly, by rotating the mount 1B the back-focus adjustment of the lens can be performed, and by screwing the setscrew 8 thereafter the mount 1B is fixed.

As explained above, by dividing the mount into one portion for mounting the lens to the body, and one portion for adjusting back-focus, it has become possible to maintain the heat radiation of the imaging device CCD excellent, to securely fix the mount to the body, and to adjust back-focus.

What is claimed is:

1. An image input apparatus in which a lens is exchangeable, comprising:
   a first mount for mounting a lens to a body, said first mount being capable of adjusting and then fixing an angle betwen an optical axis of the lens and a surface of a CCD provided on the body; and
   a second mount for adjusting a back-focus of the lens; each of said mounts being constituted as a separate member.

2. An image input apparatus according to claim 1, wherein said first mount is a C-mount.

3. An image input apparatus according to claim 1, further including angle-adjusting means for adjusting a mounting-angle at which the lens is mounted by said first mount.

4. An image input apparatus according to claim 3, wherein said angle-adjusting means includes three projections provided between said first mount and the body.

5. An image input apparatus according to claim 4, wherein at least two of said three projections consist of screws.

6. A lens-mounting device comprising:
   (a) a first mount for adjusting and then fixing a mounting-angle with regard to a body;
   (b) a distance-adjusting member for adjusting a distance between said first mount and a lens; and
   (c) a locking member for locking said distance-adjusting member.

7. A lens-mounting device according to claim 6, further including means for locking said first mount to the body.

8. A lens-mounting device according to claim 6, wherein said first mount is a C-mount.

9. A lens-mounting device according to claim 6, further including angle-adjusting means for adjusting a mounting-angle at which the lens is mounted by said first mount.

10. A lens-mounting device according to claim 9, wherein said angle-adjusting means includes three projections provided between said first mount and the body.

11. A lens-mounting device according to claim 10, wherein at least two of said three projections are screws.

* * * * *